United States Patent [19]
Takamiya et al.

[11] Patent Number: 5,256,885
[45] Date of Patent: Oct. 26, 1993

[54] DOPPLER VELOCIMETER HAVING A DIFFRACTION GRATING AND DUAL LENS GROUPS WITH IDENTICAL FOCAL DISTANCES

[75] Inventors: Makoto Takamiya, Kawasaki; Hidejiro Kadowaki, Yokohama; Yasuhiko Ishida, Tokyo; Hiroshi Sugiyama, Yokohama, all of Japan

[73] Assignee: Canon Kabushiki Kaisha, Tokyo, Japan

[21] Appl. No.: 997,129

[22] Filed: Dec. 24, 1992

Related U.S. Application Data

[63] Continuation of Ser. No. 702,378, May 20, 1991, abandoned.

[30] Foreign Application Priority Data

May 21, 1990 [JP] Japan .................. 2-130590

[51] Int. Cl.$^5$ .............................................. G01V 9/04
[52] U.S. Cl. ...................................... 250/561; 356/28
[58] Field of Search .............. 250/561; 356/28, 28.5; 359/216, 217

[56] References Cited

U.S. PATENT DOCUMENTS

| | | | |
|---|---|---|---|
| 3,756,723 | 9/1973 | Hock | 356/110 |
| 4,242,194 | 12/1980 | Steiner et al. | 356/28 |
| 4,669,876 | 6/1987 | Dopheide | 356/28.5 |
| 4,697,922 | 10/1987 | Gunter, Jr. et al. | 356/28.5 |
| 4,729,109 | 3/1988 | Adrian et al. | 356/28 |

FOREIGN PATENT DOCUMENTS 0127244 12/1984 European Pat. Off.

OTHER PUBLICATIONS

"Doppler Velocimeter Using Diffraction Grating and White Light" by C. P. Wang; *Applied Optics*, vol. 13; No. 5; May (1974) pp. 1193-1195.

"Two-dimensional Bragg cell LDV system using multiple light frequencies" by W. Michael Farmer; *Applied Optics*, vol. 17, No. 2, Jan. 1978 pp. 166-168.

"Grating diffraction spectra as coherent light sources for two-or three-beam interferomerty" by A. Lohmann; Optical Acta; Int'l *Journal of Optics* vol. 9, No. 1, Jan. 1962 pp. 1-12.

*Nuclear Instruments & Methods in Physics Research./B* vol. 40/41, No. II Apr. 1989, Amsterdam, NL pp. 1178-1181; W. G. Davies "The design of ion-optial systems for medical and industrial application", paragraphs 4-paragraph 5; FIGS. 2-3.

*Primary Examiner*—David C. Nelms
*Assistant Examiner*—Que T. Le
*Attorney, Agent, or Firm*—Fitzpatrick, Cella, Harper & Scinto

[57] ABSTRACT

An apparatus for detecting the velocity information of an object comprises a light source; optical system for irradiating beam from the light source, which is provided with a first lens or lens group and a second lens or lens group having an identical focal distance which are arranged apart from each other substantially two times such focal distance along the direction of the optical axis, to irradiate the beam onto the measuring object through the first and second lenses or lens group, and the optical system being arranged so as to make the value of sin $\theta/\lambda$ substantially constant where $\theta$ is the incident angle of the beam irradiated onto the measuring object and $\lambda$ is the wavelength of the beam; and detector for detecting the scattering rays of light from the measuring object irradiated by the above-mentioned optical system to detect the velocity information of the measuring object. With the constituents thus arranged, the apparatus is capable of effectively preventing the deviation of the intersecting position of the beams irradiated on the measuring object to perform a high-precision detection of the velocity information at all times.

11 Claims, 6 Drawing Sheets

DOPPLER VELOCIMETER HAVING A DIFFRACTION GRATING AND DUAL LENS GROUPS WITH IDENTICAL FOCAL DISTANCES

This application is a continuation of application Ser. No. 07/702,378 filed May 20, 1991 now abandoned.

BACKGROUND OF THE INVENTION

1. Field of the Invention

The present invention relates to a detector for detecting information on displacement of a moving object or fluid, or a velocimeter for measuring the velocity of a moving object without contacting them. The present invention relates in particular to a Doppler velocimeter for detecting velocity by detecting the frequency shift of light.

2. Related Background Art

Traditionally, the laser Doppler velocimeter has been used to perform a noncontact high-precision measurement of the traveling velocity of a moving object or fluid. The laser Doppler velocimeter for measures the traveling velocity of the moving object or fluid by utilizing the effect (Doppler effect) that the frequency of rays of light scattered by the moving object or fluid is shifted in proportion to its traveling velocity when a laser beam is irradiated onto the moving object or fluid.

FIG. 1 is a view illustrating an example of the conventional laser Doppler velocimeter.

In FIG. 1, the laser light emitted from the laser light source 1 is made into the parallel beams 3 by the collimator lens 2, and split into two beams 5a and 5b by the beam splitter 4. The split beams 5a, 5b are reflected by the reflection mirrors 6a and 6b respectively and are irradiated at an incident angle $\theta$ by the beam irradiation onto one and a same position on a moving object or fluid 7 at a traveling velocity V. The scattering lights from the moving object at that time are detected by the photodetector 9 through the condenser lens 8. The frequency of the scattering rays of light produced by the two beams is proportional to the traveling velocity V and is affected by the Doppler shift of $+\Delta f$ and $-\Delta f$, respectively. Now, given the wavelength of the laser light as $\lambda$, the $\Delta f$ can be expressed in an equation (1) given below.

$$\Delta f = V \sin(\theta)/\lambda \quad (1)$$

The scattering rays of light affected by the Doppler shifts $+\Delta f$ and $-\Delta f$, interfere with each other to result in the variation of light intensity on the light receiving plane of the photodetector 9. Its frequency F is obtainable by an equation (2) given below.

$$F = 2\Delta f = 2V \sin(\theta)/\lambda \quad (2)$$

With the measurement by the equation (2) of the frequency F (hereinafter referred to as Doppler frequency) of the photodetector 9, the traveling velocity V of the moving object 7 can be obtained.

In such a laser Doppler velocimeter as in the above example of the conventional art, the Doppler frequency F is inversely proportional to the laser wavelength $\lambda$ as seen from the equation (2). Therefore, it is necessary for the laser Doppler velocimeter to use a laser light source capable of emitting a light having stable wavelength. As a laser light source capable of continuous transmission with a stable wavelength, a gas laser such as He - Ne is often employed, but the size of its laser oscillator is large and a high voltage power source is needed. Accordingly, the apparatus becomes large and expensive. On the other hand, the laser diode (or semiconductor laser) employed for a compact disc, video disc, optical fiber communications or the like is very small and easy to drive. However, there is a problem of temperature dependence.

FIG. 2 (quoted from Optical Semiconductor Devices compiled in Mitsubishi Semiconductor Data Book 1987) illustrates an example of the typical temperature dependence of a laser diode. The the continuous wavelength changes continuously is caused mainly by the temperature changes of the refractive index of the active layer of the laser diode, which is 0.05–0.06 nm/°C. The discontinuous wavelength changes is called longitudinal mode hopping, which is 0.2–0.3 nm/°C.

In order to stabilize the wavelength, a controlling method is usually adopted to maintain the laser diode at a constant temperature. Such method requires the installation of the temperature control members such as a heater and a radiator; and temperature sensor with small thermal resistance to control the temperature precisely. This makes the laser Doppler velocimeter comparatively large in its size and high in its cost in addition, it is still impossible to eliminate completely the instability resulting from the longitudinal mode hopping.

With a view to solving the above-mentioned problems, a method for detecting the scattering lights from a moving object or fluid by the use of a photodetector has been proposed in U.S. patent application Ser. No. 501499, as a laser Doppler velocimeter, in which the laser light as the light source is incident on a diffraction grating, and the two diffracted lights obtained therefrom, which are $+n$ order and $-n$ order (n is 1, 2, and, ...) except zero order, are irradiated onto the moving object at an intersecting angle which is the same as the angle formed by the two beams.

FIG. 3 illustrates an example of diffraction wherein a laser light I is incident on a transmission type diffraction grating 10 having a grating pitch d, perpendicularly to the direction in which the grating is arrayed, and the diffraction angle $\theta_n$ is expressed by an equation given below.

$$\sin \theta_n = m \lambda/d$$

where m is the refraction order (0, 1, 2, and ...) and $\lambda$ is the wavelength of light.

Here, the light of $\pm n$ order other than zero order is expressed by an equation given below.

$$\sin \theta_n = \pm n \lambda/d \quad (3)$$

where n is 1, 2, and ...

FIG. 4 is a view illustrating the two-beam irradiation of said $\pm n$ order light onto the measuring object 7 by the use of the mirrors 6a and 6b in such a manner that its incident angle becomes $\theta_n$. The Doppler frequency F of the photodetector 9 is expressed by an equation given below, obtained from the equations (2) and (3):

$$F = 2V \sin \theta_n/\lambda = 2nV/d \quad (4)$$

The Doppler frequency F does not depend on the wavelength of the laser light I and is inversely proportional to the grating pitch d of the refraction grating 10 and is proportional to the traveling velocity V of the measuring object 7. Because the grating pitch d is sufficiently stable, a frequency proportional to only the traveling velocity V of the measuring object 7 is obtained as the Doppler frequency F. In this respect, when a reflection type diffraction grating is used as the grating 10, same result will be obtained.

SUMMARY OF THE INVENTION

The present invention is the improvement of those disclosed in the aforementioned applications filed earlier, and it is a first object is to provide a Doppler velocimeter capable of performing a high-precision detection of the traveling velocity of a moving object at all times, at the same time, enabling further the reduction of its luminous energy loss, and facilitating the application of the large fringe area using the parallel beams, by effectively preventing, with an appropriately arranged optical system, the deviation of the intersecting position of the spots of the two diffraction lights on the surface of a moving object, which occurs following the variation of the diffraction angle of the diffraction light of a specific order from the diffraction grating when the wavelength λ of the laser light fluctuates.

It is a second object of the present invention to provide a Doppler velocimeter, the operation of which is improved by making the distance from the end of the apparatus to the measuring point (working distance) longer.

The other objects of the present invention will be clear in the detailed descriptions to be made later of the embodiments according to the present inventions.

DETAILED DESCRIPTION OF THE PREFERRED EMBODIMENTS

Figure 1:
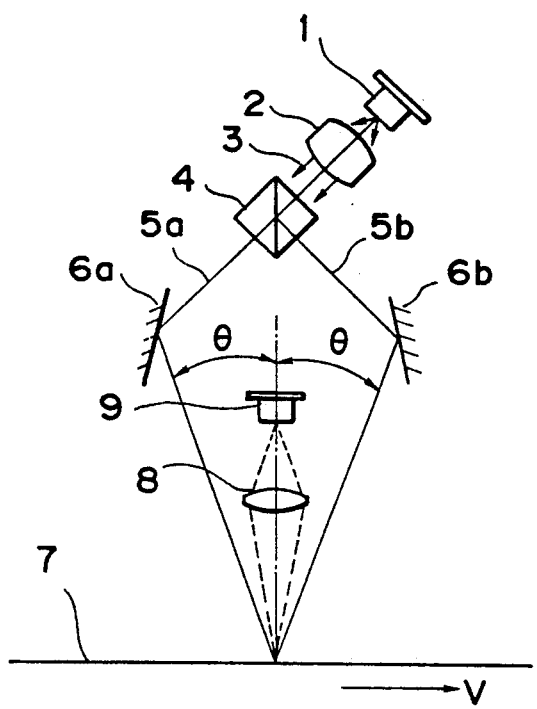
FIG. 1 is a view showing an example of the conventional laser Doppler velocimeter.

The principle of the present invention will be described in conjunction with FIG. 5, in which a reference numeral 10 designates the same diffraction grating as has been described earlier; 11 and 12, lenses having focal distance f; and $I_0$, $O_1$, $I_2$, and $I_3$ designate optical paths for the measuring beam. The lenses 11 and 12 are arranged apart by a distance 2f, and given the distance between the diffraction grating 10 and the lens 11 as "a", and the distance between the lens 12 and the measuring point M on a measuring object as "b", $a+b=2f$. A reference mark D designates the virtual divergence origin and a reference mark "a" designates the distance from D to the lens 11.

The laser light having a wavelength λ is made into a parallel beam $I_0$ by a collimator lens and others (not shown) and incident on the transmission type diffraction grating 10 perpendicularly to the direction in which the grating 10 is arrayed. Then, the diffraction light $I_1$ is emitted at a diffraction angle $\theta_1$. When the beam $I_1$ is incident on the convex lens 11 having the focal distance f, a beam $I_2$ such as shown in FIG. 5 is obtained. When the beam $I_2$ is incident on another convex lens 12 arranged apart by 2f, the collimated light $I_3$ is obtained, which is irradiated onto the measuring object at an incident angle which is the same as the refraction angle $\theta_1$ from the diffraction grating (here, the incident angle is designated by a reference mark $\theta_2$).

In this respect, another diffraction light of different reference mark from the diffraction grating 10 intersects said beam at the measuring point M through an axisymmetric optical path, thereby forming the fringe thereon. In FIG. 5, however, the diffraction light of the different reference mark is omitted. The scattering rays of light from the object to be measured traveling at a velocity V are detected by a detector (not shown), and the optical signals, which contain the Doppler signals expressed by an equation given below in accordance with the equation (2), are detected.

$$F = 2V\sin\theta_2/\lambda \tag{6}$$

In this system, if the variation of the focal distance of the lenses caused by the wavlength fluctuation is neglected, the angle of emission (diffraction angle) $\theta_1$ of the diffraction light $I_1$ and the angle of incidence $\theta_2$ to the object to be measured maintain the relationship of $\theta_1 = \theta_2$ even when the refraction angle is varied due to the wavelength fluctuation. Also, provided that the diffraction light is a light of n order, the equation given below can be obtained.

$$\sin\theta_1 = n\lambda/d \tag{7}$$

Therefore, from the equations (6) and (7), an equation given below is obtained.

$$F = 2V\sin\theta_2/\lambda = 2V\sin\theta_1/\lambda = 2nV/d \tag{8}$$

From the equation (8), it is apparent that the Doppler frequency which is not affected by fluctuation of the wavelength is obtained in this system. Since the $\sin\theta_2/\lambda$ is a constant value in this system, it is possible to obtain the Doppler frequency which is not affected by the wavelength fluctuation.

Figure 2:
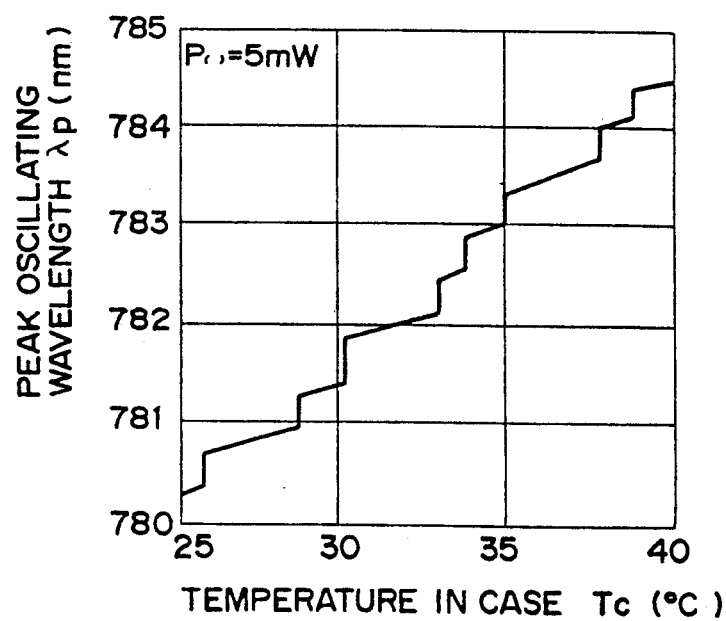
FIG. 2 is a graph showing an example of the temperature dependence of the oscillating frequency of a laser diode.
Figure 3:
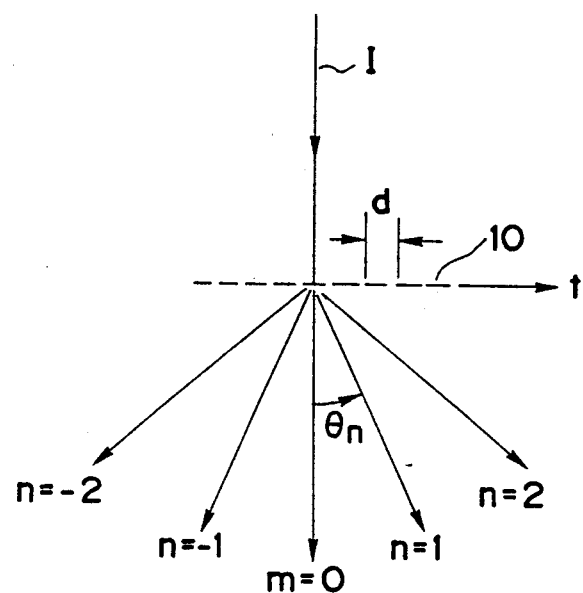
FIG. 3 is a view illustrating a diffraction grating.

The influence of the varying angles of the diffraction due to the wavelength fluctuations of the lens group $6a$ and $6b$, which has been neglected earlier, is now taken into account. As the wavelength λ changes by the temperatures as shown in FIG. 2, a wavelength fluctuation of approximately 10 nm is considered at the time of applying the working temperature.

Now, in the two wavelengths, $\lambda_1 = 780$ nm and $\lambda_2 = 790$ nm, if the lens material is BK7, the refraction indices are $n_1 = 1.51118$ and $n_2 = 1.51098$, respectively, and in terms of the ratio of the focal distances, $$f_1/f_2 = (n_1 - 1)/(n_2 - 1) \approx 1.00039 \tag{9}$$

where $f_1$ and $f_2$ are the focal distances for the respective wavelengths.

Figure 5:
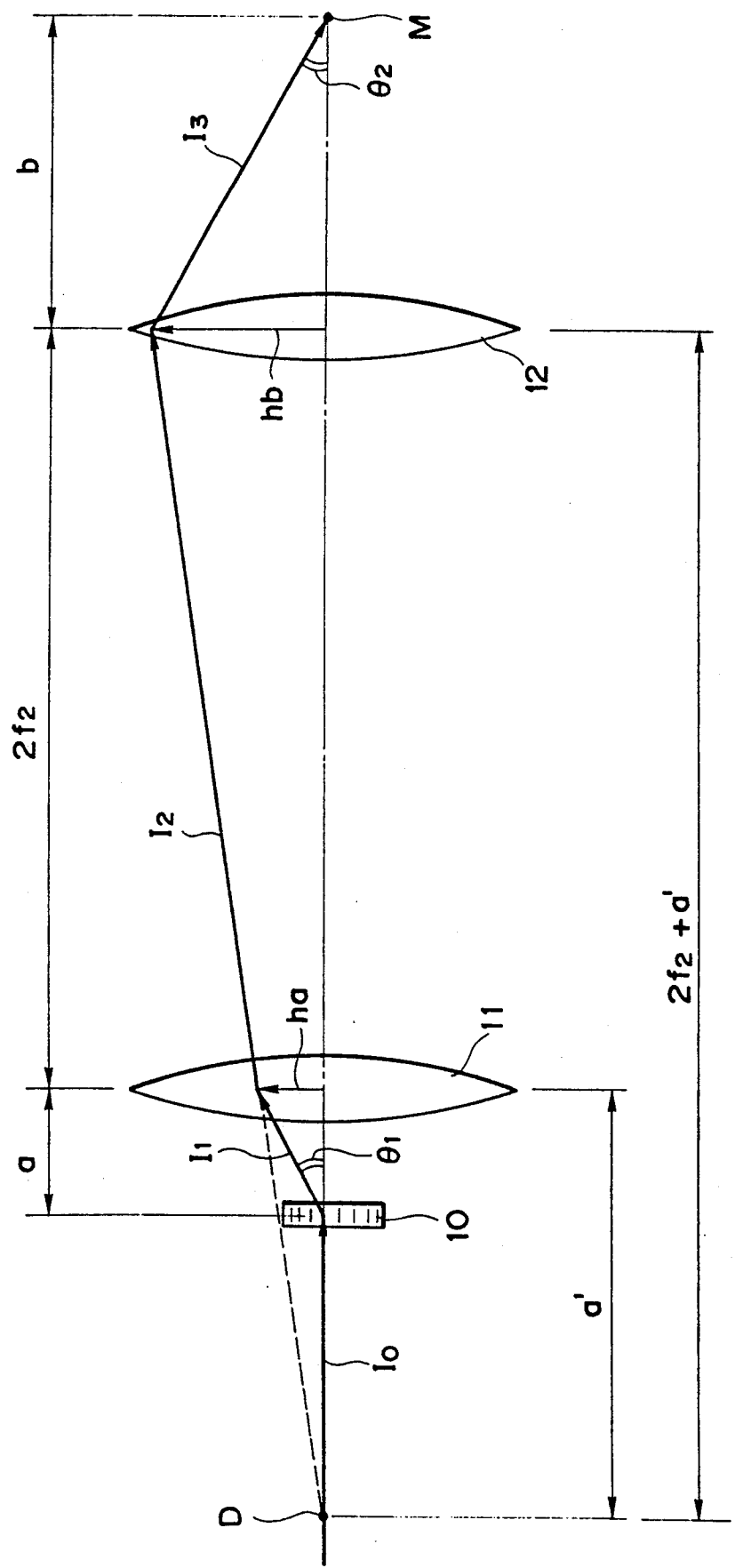
FIG. 5 is a view illustrating the principle of the present invention.

Now, the distance between the lenses is established as two times of the focal distance $f_2$ at $\lambda_2 = 790$ nm in FIG. 5. With this arrangement, if the wavelength $\lambda_2 = 790$ nm is taken into account, the result is $\sin\theta_1 = \sin\theta_2$ based on the condition that $a + b = 2f_2$ as described earlier.

Next, the wavelength $\lambda_1 = 780$ nm is taken into account in this arrangement. The $\theta_1$ and $\theta_2$ given below are the angles of this wavelength. The focal distance $f_1$ of the lens changes in accordance with the ratio expressed by the equation (9). Then, if the ray tracing of the beam $I_1$ is executed, the expression given below is established for the lens 11.

$$-\frac{1}{a'} + \frac{1}{a} = \frac{1}{f_1} \begin{pmatrix} a' > 0 \\ a > 0 \end{pmatrix}$$

Also, the following equation is established:

$$d \sin \theta_1 = \lambda_1$$

where d is the grating space of the diffraction grating. By this equation, the $\theta_1$ is induced. Also, for the lens 12, the position of the beam $I_2$ on the axis, i.e., D, is $2f_2 + a'$. Therefore, $$\frac{1}{2f_2 + a'} + \frac{1}{b} = \frac{1}{f_1} \quad (b > 0)$$

On the other hand, the respective distances $h_a$ and $h_b$ of the incident position of beam on the lens 11 and 12 from the optical axis becomes $$h_a = a \tan \theta_1$$

$$h_b = h_a \left( \frac{2f_2 + a'}{a'} \right)$$

Therefore, $\theta_2$ is induced by the equation given below.

$$\theta_2 = \tan^{-1} (h_b / b)$$

In terms of the ratio of the Doppler signals:

$$F_1 = \frac{\sin \theta_2}{\sin \theta_1} F_2 \begin{pmatrix} F_1: \text{Doppler frequency at } \lambda_1 \\ F_2: \text{Doppler frequency at } \lambda_2 \end{pmatrix}$$

Now, $\theta_1$ and $\theta_2$ are obtained by assigning $f_2 = 30$ mm, $a = 10$ mm, and $d = 1.6$ $\mu$m, and assigned to the above-mentioned equation. Then, the result is $$F_1 = 0.99960 \cdot F_2$$

and the error is just 0.04%. Now, if the $\theta_1$ and $\theta_2$ are obtained by assigning $f_2 = 30$ mm, $a = 30$ mm, and $d = 1.6$ $\mu$m, the result is:

$$F_1 = 0.99999977 \, F_2$$

This is also negligible as in the above case. In other words, it is safe to consider that the variation of the refraction index caused by the wavelength fluctuation of the lens of approximately 10 nm is substantially negligible. Said discussion is made for a single-piece lens, but the precision is further improved if a double-piece lens, the chromatic aberration of which has been corrected, is used, for example.

In this way, it can be deduced that the Doppler frequency is not affected substantially by the wavelength fluctuation. Also, in this system, the "a+b" does not change substantially even if the $\theta_1$ varies. As a result, the beam $I_3$ should always pass through the point M, and there is no substantial deviation generated by the wavelength fluctuation between the two beams intersecting each other at the point of measurement. Furthermore, the beam transmitted through the diffraction grating 10 is deflected by the lens system rather than an element such a as diffraction grating which results in a considerable loss of luminous energy, therefore, it is possible to intensify the signal light with ease. Also, it is easy to form a wide area of parallel fringes on the intersecting point, because if parallel light is incident on the diffraction grating 10, the light emitted from the second lens 12 is necessarily parallel light since the distance between the lenses is 2f.

Subsequently, the present invention will be described using a specific embodiment.

Figure 6:
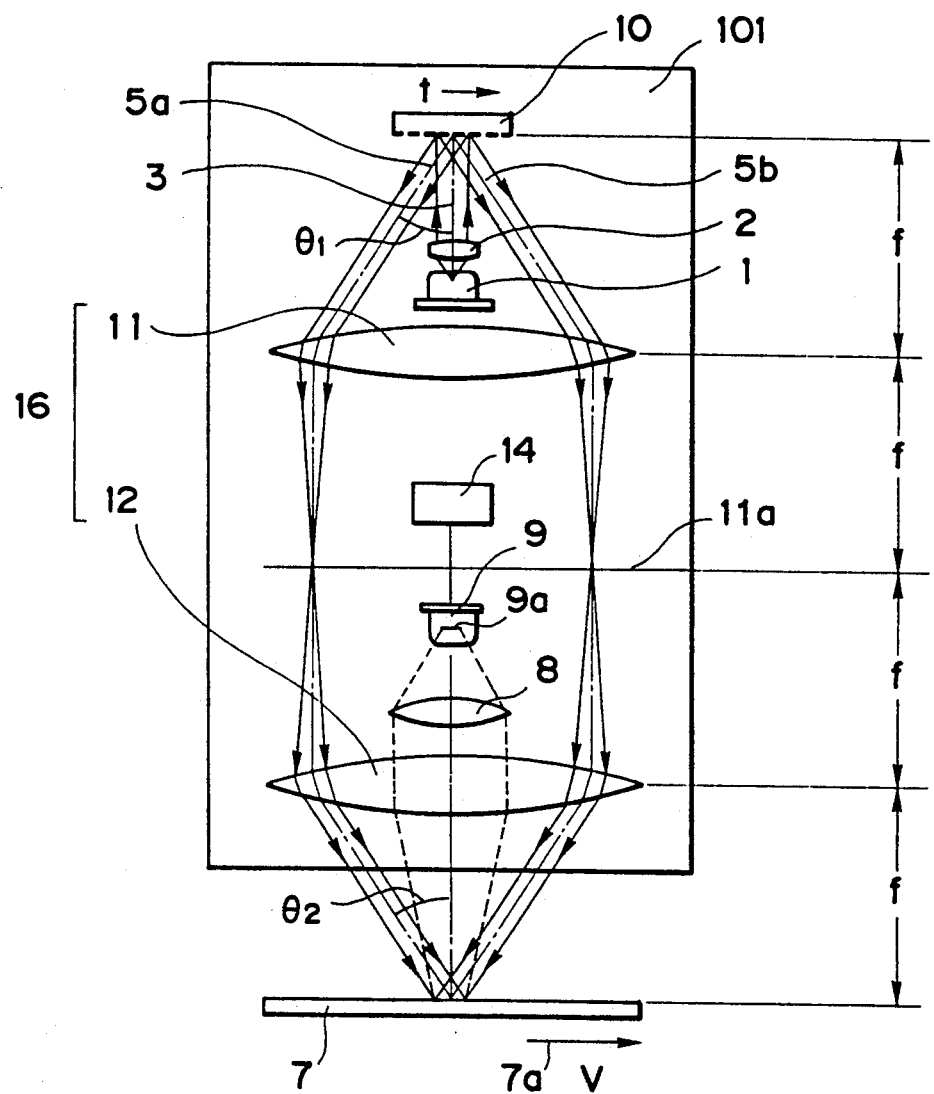
FIG. 6 is a view illustrating a first embodiment according to the present invention.

FIG. 6 is a view schematically showing the principal part of the optical system of an embodiment according to the present invention. In FIG. 6, a reference numeral 101 designates a Doppler velocimeter; 1, a light source comprising a laser diode, semiconductor, or the like, for example (hereinafter referred to as laser); 2, a collimator lens for producing a beam of parallel light 3 from the beam emitted from the laser 1; and 10, a diffraction grating which is arranged to diffract the reflection type diffraction light of ± primary order having the grating pitch d of 1.6 $\mu$m at a diffraction angle $\theta_1$ ($\theta_1 = 29°$).

A reference numeral 16 designates an optical system comprising two single-piece lenses or lens groups 11 and 12 (hereinafter referred to as lens group), having a substantially same focal distance f, which are arranged with a space two times of the focal distance f; 7, a moving object or moving fluid (hereinafter referred to as moving object) in motion in the direction indicated by arrow 7a at a traveling velocity V.

In the present embodiment, the space between the diffraction grating 10 and the lens group 11 and the space between the moving object 7 and the lens group 12 are both established as substantially the same length as the focal distance f.

A reference numeral 8 designates a condenser lens which converges the scattering rays of light affected by the Doppler shift from the moving object 7 on the detecting surface 9a of an photodetector 9 functioning as detecting means. The surface of the moving object 7 and the detecting surface 9a have a substantially conjugate relationship.

A reference numeral 14 designates computing means such as an electronic computer for obtaining the traveling velocity V of the moving object 7 using the Doppler signals obtained by the photodetector 9.

In the present embodiment, the laser light emitted from the laser 1 (laser diode, wavelength $\lambda = 0.78$ $\mu$m) is produced by the collimator lens 2 into the parallel beam 3 of approximately 2 mm diameter, and is incident on the reflection type diffraction grating 10 perpendicular to the direction t in which the grating 10 is arrayed. Then, the diffraction lights 5a and 5b ±n order (in the present embodiment, n=1) diffracted by the diffraction grating 10 at the diffraction angle $\theta_1$ are converged by the lens group 11 at a position 11a and subsequently diverged, and then emitted as the parallel beams through the lens group 12. Then, the parallel beams are incident on the moving object 7 each from the different direction at the same angle $\theta_2$ as the diffraction angle $\theta_1$ (i.e., $\theta_1 = \theta_2$).

In the present embodiment, when the wavelength $\lambda$ of the laser light fluctuates the diffraction angle $\theta_1$ of the diffraction light of a specific order also changes. At this juncture, however, the value of sin $\theta_2/\lambda$ is made constant by the system formation set forth earlier.

The two diffraction lights 5a and 5b are irradiated to intersect each other so that the spots thereof are overlapped on the surface of the moving object 7.

In the present embodiment, the focal distances f of the lens group 11 and the lens group 12 in the optical system 16 are substantially equal, and the diffracting grating 10 and the moving object 7 are arranged in the optical system 16 so as to have a conjugate relationship of equal magnification. At this juncture, the two diffraction lights 5a and 5b on the surface of the moving object 7 are spots of approximately 2 mm diameter.

Even when the diffraction angle $\theta_1$ formed by the diffraction lights ±n order from the diffraction grating 10 is changed into a diffraction angle $\theta_1'$ due to the fluctuation of the wavelength $\lambda$ of the laser light, the diffraction lights of the ±n order incident on the lens group 11 form an image on the surface at the position 11a (a position at which the image height is slightly different from the diffraction angle $\theta_1$ of the diffraction lights 5a and 5b) in the present embodiment, and are subsequently diverged and made by the lens group 12 to be the parallel beams to be irradiated onto the surface of the moving object 7 at the angle $\theta_1'$. Then, at this time, the two beams are formed to maintain the state in which its spots are overlapped with each other thereon.

The condenser lens 8 converges on the detecting surface 9a of the photodetector 9 and the scattering rays of light have a frequency affected by the Doppler shifts, $\Delta f$ and $-\Delta f$, which are proportional to the traveling velocity V of the moving object 7 and are expressed by the equation (1). At this time, the two scattering rays of light affected by the Doppler shift $\Delta f$ and $-\Delta f$ interfere with each other on the detection surface 9a. The photodetector 9 detects the luminous energy based on the luminous intensity of the interference fringe thus produced. In other words, the photodetector 9 detects the Doppler signals which do not depend on the wavelength $\lambda$ of the laser 1 having the Doppler frequency F, $$F = 2V/d \tag{10}$$

which is proportional to the traveling velocity V in the equation (8) where n=1. Then, by the operation of the computing means 14, the traveling velocity V is obtained by the equation (10) using the output signals from the photodetector 9.

Figure 4:
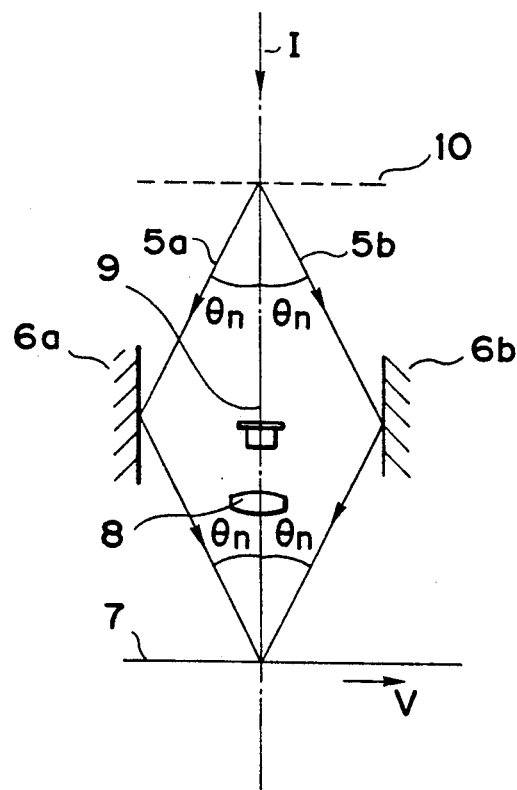
FIG. 4 is a view illustrating a laser Doppler velocimeter using the diffraction grating.
Figure 7A:
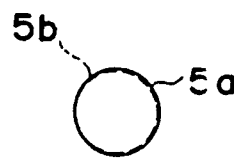
FIGS. 7A, 7B, and 7C are views showing the respective states of beam deviations.
Figure 7B:
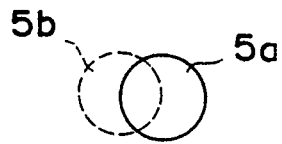
Figure 7C:
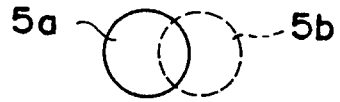

For example, in the system as shown in FIG. 4, if the oscillating wavelength of the laser 1 fluctuates, the spots of the two diffracted lights 5a and 5b deviate and do not overlap with each other on the surface of the moving object 7, for example as shown in FIG. 7B and FIG. 7C. The scattering rays of light detected by the photodetector 9 are those from the area where the two spot diameters $L_{5a}$ and $L_{5b}$ are overlapped. Therefore, if the two spot diameters $L_{5a}$ and $L_{5b}$ do not overlap but deviate, the detected amount of the scattering rays of light for the detection of the photodetector 9 is decreased. As a result, the S/N ratio of the Doppler signal is lowered, and there is a possibility that the measurement precision for the traveling velocity V is degraded.

To counteract this in the present embodiment, each element is arranged as has been described to enable the two diffraction lights 5a and 5b diffracted by the diffraction grating 10 to intersect the spots thereof to substantially overlap with each other on the surface of the moving object 7 without fail as shown in FIG. 7A.

Thus, the S/N ratio of the Doppler signals obtained by the photodetector 9 is maintained in an excellent condition to make a high-precision detection of the traveling velocity V of the moving object 7 possible.

In the present embodiment, although the reflection type diffraction grating is employed, a transmission type grating can be applied in the same manner.

Figure 8:
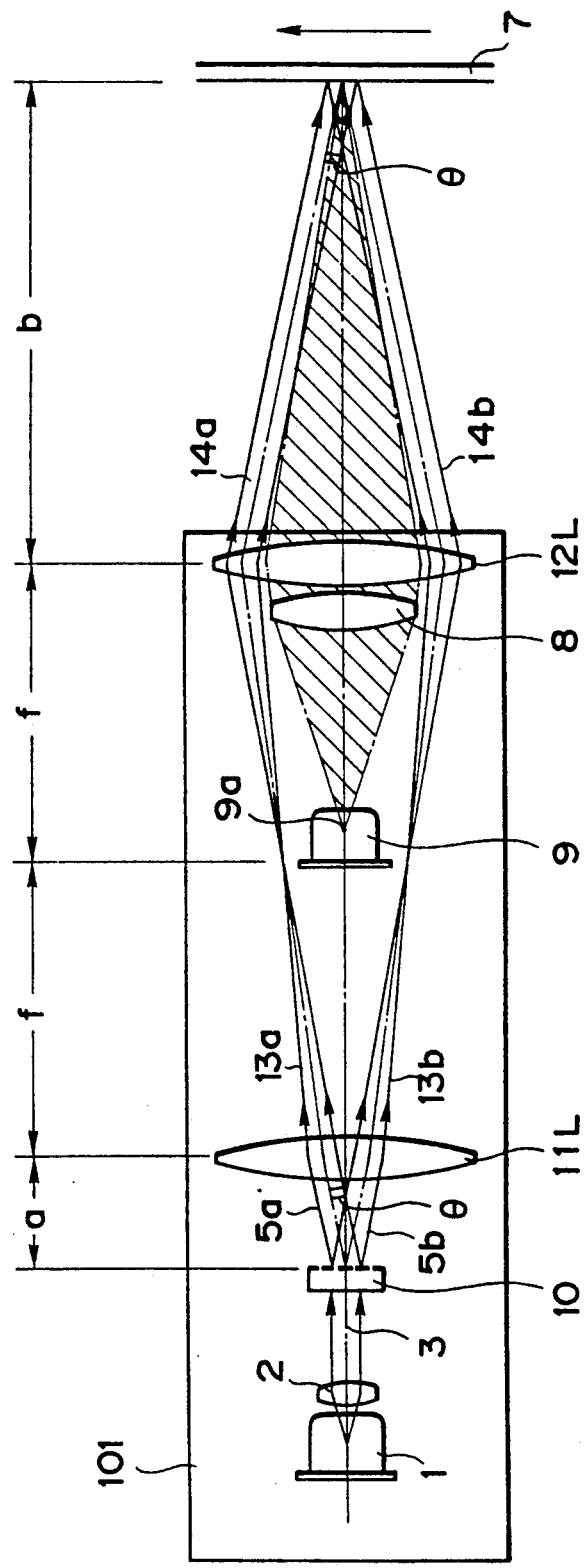
FIG. 8 is a view illustrating a second embodiment according to the present invention.

FIG. 8 is a view schematically showing the principal part of the optical system of a second embodiment according to the present invention, in which the same reference marks are provided for the same members appearing in the first embodiment. In this respect, the computing means 14 is omitted.

In FIG. 8, a reference numeral 10 designates a diffraction grating, and 11L and 12L, convex lenses having the focal distance f, which are structurally arranged as shown in FIG. 8. However, the distances "a" and "b" satisfy the relationship of "a+b=2f".

The laser light having the wavelength $\lambda$ of approximately 0.68 $\mu$m from the laser diode 1 is made by a collimator lens 2 to be the parallel beam 3 of 2 mm $\phi$ and incident on a transmission type diffraction grating 10 perpendicularly to the grating arrangement direction. Then, the diffraction lights 5a and 5b of ± primary order are emitted at a diffraction angle $\theta = 12°$. When the beams 5a and 5b are incident on the convex lens 11L having the focal distance f, such beams 13a and 13b as shown in FIG. 8 are obtained. When the beams 13a and 13b are incident on another convex lens 12L which is arranged at a position 2f away, the parallel beams 14a and 14b are again obtained, which are irradiated onto the measuring object 7 as the spot diameters of 2 mm $\phi$ at the same angle as the diffraction angle $\theta$ from aforesaid diffraction grating. Then, the scattering rays of light from the measuring object 7 are effectively converted by the convex lens 12L and a condenser lens 8 on the light receiving surface 9a of the photodetector 9 to detect the optical signal containing the Doppler signal expressed by the equation (10).

Here, if the wavelength $\lambda$ of the laser diode 1 fluctuates, the angle $\theta$ varies in response to the relationship of $d \sin \theta = \lambda$. However, if the measuring object 7 is set with the arrangement as shown in FIG. 8 while the position of the two beam spots is made invariant, no deviation of the two-beam spots occurs.

Also, since the space a<b, the space b becomes comparatively long, whereby the working distance becomes greater. Hence, there is more freedom obtainable in installing the velocimeter.

In the present embodiment, although the transmission type diffraction grating is shown, a reflection type may also be employed as well.

In the first and second embodiments set forth above, the diffraction light of ± primary order is used, but a diffraction light of the second order or more may also be applied in addition thereto.

Further, it may be possible to input the laser light 3 into the diffraction grating 10 at a specific angle, not necessarily at an incident angle perpendicular thereto. In this case, two diffraction lights of ±n order diffraction light should be irradiated onto the moving object while the same intersecting angle as the intersecting angle formed by the two diffraction lights of the ±n order diffraction light from the diffraction grating 10 is being maintained.

As long as a beam emitted from the same light source is used and provided that at least one of the two diffraction lights irradiated onto the moving object is an n order diffraction light, the other diffraction light can be any order other than the n order, such as 0, n+1, n+2, or the like.

It may be possible to obtain the Doppler signals in such a manner that one of the beams, emitted from the same light source to be inputted into light receiving elements, is irradiated onto a moving object as an n order diffraction light, while the other is directly incident on the light receiving elements, not through the moving object, to interfere with the scattering rays of light from the moving object.

There is a method of moving the diffraction grating in the grating arrangement direction in order to apply a bias to the Doppler signal for detecting the velocity in the vicinity of zero and the traveling direction. In this case, it is possible to obtain the same effect if the optical construction is formed in the same way as shown in FIG. 6 and FIG. 8. Also, it may be possible to employ an acoustic-optical element instead of the method of moving diffraction grating in the grating arrangement direction.

In the descriptions of the embodiments according to the present invention, a single-piece thin lens is represented as the lens to be applied, however, it is possible to use a single-piece thick lens as a matter of course. In such a case, the distance between the principal plane of an image of the front lens 11 and the principal plane of an object of the rear lens 12 should be established to be substantially 2f (two times the focal distance). Similarly, when the lenses 11 and 12 are constructed by lens groups, i.e., equivalent lens system comprising a plurality of lenses, the distance between the principal plane of image of the lens group 11 and the principal plane of object of the lens group 12 should be substantially 2f. The description in the present application hereof, which refers to being set apart from each other substantially two times the focal distance, includes those mentioned above as a matter of course.

Also, in this case, a reference mark "a" should designate the space between the principal plane of object of the lens (group) 11 and the diffraction grating 10 and a reference mark "b" should designate the space between the principal plane of image of the lens (group) 12 and the measuring point.

What is claimed is:

1. An apparatus for detecting a velocity information of an object, including:
    light source means;
    optical means for irradiating a beam from said light source onto an object to be measured, which comprises a diffraction grating for diffracting a beam from said light source and a first lens or lens group and a second lens or lens group with identical focal distance, said first lens or lens group and said second lens or lens group being apart from each other substantially two times said focal distance along a direction of an optical axis, a sum of a distance from said diffraction grating to said first lens or lens group and a distance from the object to be measured to said second lens or lens group being equal to a distance two times said focal distance and the distance from said diffraction grating to said first lens or lens group being smaller than the distance from the object to be measured to said second lens or lens group, at least one beam diffracted by said diffraction grating being irradiated onto said object to be measured through said first lens or lens group and said second lens or lens group; and
    detecting means for detecting a light from the object to be measured to which said beam has been irradiated by means of said optical means, whereby the velocity information of the object to be measured is detected by said detecting means.

2. An apparatus according to claim 1, wherein said optical means causes intersection on the object to be measured of ±n order diffraction lights from said diffraction grating through said two lenses or lens groups on the object to be measured, where n is an arbitrary natural number.

3. An apparatus according to claim 1, wherein said detecting means detects scattering rays of light from the object to be measured and outputs Doppler frequency signals in response to a velocity of the object to be measured, the velocity information of the object to be measured being detected from said Doppler frequency signals.

4. A method of detecting a velocity information of an object, including the steps of:
    irradiation of a beam to an object to be measured, said irradiation using a diffraction grating for diffracting a beam and a first lens or lens group and a second lens or lens group with identical focal distance, said first lens or lens group and said second lens or lens group being apart from each other substantially two times said focal distance along a direction of an optical axis, a sum of a distance from said diffraction grating to said first lens or lens group and a distance from the object to be measured to said second lens or lens group being equal to a distance two times said focal distance and the distance from said diffraction grating to said first lens or lens group being smaller than the distance from the object to be measured to said second lens or lens group, at least one beam diffracted by said diffraction grating being irradiated onto said object to be measured through said first lens or lens group and said second lens or lens group; and
    detection of a light from the object to be measured to which said beam has been irradiated, whereby the velocity information of the measuring object is detected by said detection.

5. A method according to claim 4, wherein said irradiation is performed by intersection ±n order diffraction lights from said diffraction grating through said two lenses or lens groups on the object to be measured, where n is an arbitrary natural number.

6. A method according to claim 4, wherein said detection is performed by receiving scattering rays of light from the object to be measured and outputting Doppler frequency signals in response to the velocity of the object to be measured, the velocity information of the object to be measured being detected from said Doppler frequency signals.

7. An apparatus for detecting a velocity information of an object, including:
    a light source;
    an optical system for irradiating a beam from said light source onto an object to be measured, which comprises a diffraction grating for diffracting a beam from said light source and a first lens or lens group and a second lens or lens group with identical focal distance, said first lens or lens group and said second lens or lens group being apart from each other substantially two times said focal distance along a direction of an optical axis, a sum of a distance from said diffraction grating to said first lens or lens group and a distance from the object to be measured to said second lens or lens group being equal to a distance two times said focal distance and the distance from said diffraction grating to said first lens or lens group being smaller than the distance from the object to be measured to said second lens or lens group, at least one beam diffracted by said diffraction grating being irradiated onto said object to be measured through said first lens or lens group and said second lens or lens group; and a photodetector for detecting a light from the object to be measured to which said beam has been irradiated by means of said optical system, whereby the velocity information of the object to be measured is detected by said photodetector.

8. An apparatus for detecting an information related to a displacement of an object, including:

light source means;

optical means for irradiating a beam from said light source onto an object to be measured, which comprises a diffraction grating for diffracting a beam from said light source and a first lens or lens group and a second lens or lens group with identical focal distance, said first lens or lens group and said second lens or lens group being apart from each other substantially two time said focal distance along a direction of an optical axis, a sum of a distance from said diffraction grating to said first lens or lens group and a distance from the object to be measured to said second lens or lens group being equal to a distance two times said focal distance and the distance from said diffraction grating to said first lens or lens group being smaller than the distance from the object to be measured to said second lens or lens group, at least one beam diffracted by said diffraction grating being irradiated onto said object to be measured through said first lens or lens group and said second lens or lens group; and detecting means for detecting a light from the object to be measured to which said beam has been irradiated by means of said optical means, whereby the information related to the displacement of the object to be measured is detected by said detecting means.

9. An apparatus according to claim 8, further including computing means for computing a traveling velocity of said object to be measured as the information related to said displacement based on a detecting result of said optical detecting means.

10. An apparatus for detecting an information related to a displacement of an object, including:

a light source;

an optical system for irradiating a beam from said light source onto an object to be measured, which comprises a diffraction grating for diffracting a beam from said light source and a first lens or lens group and a second lens or lens group being apart from each other substantially two times said focal distance along a direction of an optical axis, a sum of a distance from said diffraction grating to said first lens or lens group and a distance from the object to be measured to said second lens or lens group being equal to a distance two times said focal distance and the distance from said diffraction grating to said first lens or lens group being smaller than the distance from the object to be measured to said second lens or lens group, at least one beam diffracted by said diffraction grating being irradiated onto said object to be measured through said first lens or lens group and said second lens or lens group; and a photodetector for detecting a light from the object to be measured to which said beam has been irradiated by means of said optical system, whereby the displacement related information is detected by said photodetector.

11. An apparatus according to claim 10, further including computing means for computing a traveling velocity of said object to be measured as the information related to said displacement based on a detection result of said photodetector.

* * * * *

UNITED STATES PATENT AND TRADEMARK OFFICE
CERTIFICATE OF CORRECTION

PATENT NO. : 5,256,885            Page 1 of 2

DATED : October 26, 1993

INVENTOR(S) : MAKOTO TAKAMIYA, ET AL.

It is certified that error appears in the above-identified patent and that said Letters Patent is hereby corrected as shown below:

ON TITLE PAGE

In [56] References Cited, under OTHER PUBLICATIONS:
    Under "Grating", "interferomerty" should read
              --interferometry--.
    Under "Nuclear", "ion-optial" should read --ion-optical--
        and "graphs" should read --graph--.

COLUMN 1

Line 21, "for" should be deleted.

COLUMN 2

Line 11, "the" should be deleted.
Line 12, "continuously is" should read --are--.
Line 15, "is" should read --are--.
Line 21, "radiator;" should read --radiator,--.
Line 24, "cost in" should read --cost. In--.
Line 40, "perpendicularly" should read --perpendicular--.

COLUMN 3

Line 10, "is" (second occurrence) should be deleted.
Line 30, "inventions." should read --invention.--.
Line 63, "mark "a"" should read --mark "a'"--.

COLUMN 4

Line 25, "In" should read --¶ In--.
Line 37, close up left margin.
Line 42, close up left margin.
Line 65, "of" should be deleted.

UNITED STATES PATENT AND TRADEMARK OFFICE
CERTIFICATE OF CORRECTION

PATENT NO. : 5,256,885
DATED : October 26, 1993
INVENTOR(S) : MAKOTO TAKAMIYA, ET AL.

It is certified that error appears in the above-identified patent and that said Letters Patent is hereby corrected as shown below:

COLUMN 6

Line 6, "a as" should read --as a--.
Line 31, "of" should be deleted.

COLUMN 7

Line 67, "with" should be deleted.

COLUMN 11

Line 29, "time" should read --times--.

COLUMN 12

Line 17, "group being" should read --group with identical focal distance, said first lens or lens group and said second lens or said lens group being--.

Signed and Sealed this

Twenty-sixth Day of July, 1994

Attest:

BRUCE LEHMAN

Attesting Officer                Commissioner of Patents and Trademarks